United States Patent
Heck et al.

(10) Patent No.: US 9,544,334 B2
(45) Date of Patent: Jan. 10, 2017

(54) POLICY ROUTING-BASED LAWFUL INTERCEPTION IN COMMUNICATION SYSTEM WITH END-TO-END ENCRYPTION

(75) Inventors: John Frederick Heck, Wheaton, IL (US); Ganapathy S. Sundaram, Hillsborough, NJ (US); Douglas William Varney, Naperville, IL (US)

(73) Assignee: Alcatel Lucent, Boulogne-Billancourt (FR)

( * ) Notice: Subject to any disclaimer, the term of this patent is extended or adjusted under 35 U.S.C. 154(b) by 553 days.

(21) Appl. No.: 13/212,788

(22) Filed: Aug. 18, 2011

(65) Prior Publication Data

US 2012/0287922 A1 Nov. 15, 2012

Related U.S. Application Data

(60) Provisional application No. 61/484,897, filed on May 11, 2011.

(51) Int. Cl.
*H04L 12/28* (2006.01)
*H04L 29/06* (2006.01)

(52) U.S. Cl.
CPC ......... *H04L 63/306* (2013.01); *H04L 63/0272* (2013.01); *H04L 63/0464* (2013.01); *H04L 63/061* (2013.01); *H04L 65/1016* (2013.01)

(58) Field of Classification Search
CPC .... H04L 12/28; H04L 63/306; H04L 65/1016; H04L 63/0272; H04L 63/0464; H04L 63/061

(Continued)

(56) References Cited

U.S. PATENT DOCUMENTS

2007/0258379 A1* 11/2007 Ekstrom et al. .............. 370/250
2009/0182668 A1 7/2009 Lee
(Continued)

FOREIGN PATENT DOCUMENTS

WO 2009044472 A1 4/2009
WO PCT/US2012/035342 4/2012

OTHER PUBLICATIONS

Wikipedia, Man-in-the-middle Definition, Apr. 2011.*
(Continued)

*Primary Examiner* — Andrew Lai
*Assistant Examiner* — Albert Shih
(74) *Attorney, Agent, or Firm* — Ryan, Mason & Lewis, LLP

(57) ABSTRACT

A method for intercepting encrypted communications exchanged between first and second computing devices in a communication network, wherein interception is performed by a third computing device in the computing network. The third computing device obtains one or more packets having a packet address associated with one of the first and second computing devices in response to at least one interception routing policy being implemented in at least one element in the communication network, such that the obtained packets may be decrypted to obtain data contained therein. The third computing device preserves the packet address of the obtained packets and forwards the obtained packets toward a packet-destination one of the first and second computing devices such that the packet-destination one of the first and second computing devices is unable to detect from the one or more packets that the one or more packets were intercepted by the third computing device.

26 Claims, 12 Drawing Sheets

(58) Field of Classification Search
USPC .................. 713/169, 171, 154; 370/250, 351
See application file for complete search history.

(56) References Cited

U.S. PATENT DOCUMENTS

| 2011/0016321 | A1* | 1/2011 | Sundaram et al. | ............ 713/171 |
| 2011/0055567 | A1* | 3/2011 | Sundaram et al. | ............ 713/169 |
| 2011/0113236 | A1* | 5/2011 | Chenard et al. | ............. 713/154 |
| 2011/0153809 | A1 | 6/2011 | Ghanem et al. | |

OTHER PUBLICATIONS

Alcatel Lucent, MIKEY-IBAKE and LI, 3GPP TSG-SA3LI, May 10, 2011.*
M. Handley et al., "SDP: Session Description Protocol," Network Working Group, Request for Comments: 2327, Apr. 1998, 42 pages.
J. Rosenberg et al., "SIP: Session Initiation Protocol," Network Working Group, Request for Comments: 3261, Jun. 2002, 269 pages.
M. Baugher et al., "The Secure Real-Time Transport Protocol (SRTP)," Network Working Group, Request for Comments: 3711, Mar. 2004, 56 pages.
V. Cakulev et al., "MIKEY-IBAKE: Identity-Based Authenticated Key Exchange (IBAKE) Mode of Key Distribution in Multimedia Internet KEYing (MIKEY)," Internet Engineering Task Force (IETF), Request for Comments: 6267, Jun. 2011, 30 pages.
V. Cakulev et al., "MIKEY-IBAKE: Identity-Based Mode of Key Distribution in Multimedia Internet KEYing (MIKEY)," draft-cakulev-mikey-ibake-01.txt, Network Working Group, Internet Draft, Apr. 2010, 33 pages.
3rd Generation Partnership Project; Technical Specification Group Services and System Aspects; IP Multimedia Subsystem (IMS) media plane security, Release 9, 3GPP TR 33.828, V9.1.0, Jun. 2010, 82 pages.
"IMS Media Plane Security LI Requirements," 3GPP TSG SA WG3 LI Meeting #37, SA3LI10_045, May 2010, 10 pages.
"MIKEY-IBAKE Lawful Interception Solutions Evaluation," SA3-LI LD, V0.1.0, Jan. 2012, 16 pages.
"DTLS-SRTP as a Solution Candidate for IMS Media Plane Security," 3GPP TSG SA WG3 Security-S3#53, S3-081398, Nov. 2008, 4 pages, Japan.
"LS on IMS Media Security Lawful Interception Requirements," 3GPP TSG-SA WG3-LI Meeting #34, SA3LI09_073, Jul. 2009, 2 pages, Germany.

* cited by examiner

1200

POLICY ROUTING-BASED LAWFUL INTERCEPTION IN COMMUNICATION SYSTEM WITH END-TO-END ENCRYPTION

The present application claims priority to the U.S. provisional patent application identified as Ser. No. 61/484,897, filed on May 11, 2011, and entitled "Lawful Intercept in IMS System with End-to-End Encryption," the disclosure of which is incorporated by reference herein in its entirety.

FIELD OF THE INVENTION

Embodiments relate generally to communication security and, more particularly, to techniques for lawful interception of information in communication environments with end-to-end encryption.

BACKGROUND OF THE INVENTION

Internet Protocol (IP) communications and telephony systems have gained wide spread adoption. One of the first examples of end-to-end IP communications between two clients included Instant Messaging, but this was soon followed by Voice-over-IP and now many providers (e.g., network operators and application providers) offer end-to-end Video-over-IP. However, these trends were largely restricted to wired fixed networks, given that wireless mobile network access has been dominated by narrow-band circuit switched access networks. However, the recent deployment of broadband 4G (fourth generation) wireless networks sets the stage for all forms of multimedia over IP communications end-to-end, independent of access type.

With the transition towards end-to-end IP sessions, the market has witnessed a resurgence in interest as well as an awareness for security and privacy over these open IP networks. As a first step, end-to-end encryption and authentication are paradigms that are gaining wide attention. While contemporary Internet transactions involving commerce and Enterprise Intranet access have been secured end-to-end for over a decade now, securing conversational applications over IP have been largely left to the application provider.

With the advent of all-IP networks, such as those employing the Internet Protocol (IP) Multimedia Subsystem (IMS), it has become increasingly necessary for network operators or others who offer voice, video, and messaging services to provide end-to-end security. For example, with a Diffie-Hellman based key exchange, it is possible to create an end-to-end encrypted session between two communication end-points such that even if another party were able to obtain all the communication (bearer flows) between the two end-points, the party would still not be able to decrypt the bearer flows.

However, it is known that there is a need to be able to comply with requirements to support lawful or legal interception and discovery of security associations. For example, such legal interception and discovery of security associations may be necessary for law enforcement purposes, or simply for some non-law enforcement purpose, whereby it is necessary or desirable to be able to readily decrypt encrypted information transmitted between parties and/or devices.

SUMMARY OF THE INVENTION

Illustrative embodiments provide techniques for lawfully intercepting information in communication environments with end-to-end encryption.

For example, in one example embodiment, a method for intercepting encrypted communications exchanged between a first computing device and a second computing device in a communication network, wherein the interception is performed by a third computing device in the communication network, comprises the following steps. The third computing device obtains one or more packets having a packet address associated with one of the first computing device and the second computing device. The one or more packets are obtained by the third computing device, in response to at least one interception routing policy being implemented in at least one element in the communication network, such that the one or more obtained packets may be decrypted so as to obtain data contained therein. The third computing device preserves the packet address of the one or more obtained packets. The third computing device forwards the one or more packets toward a packet-destination one of the first computing device and the second computing device such that the packet-destination one of the first computing device and the second computing device is unable to detect from the one or more packets that the one or more packets were intercepted by the third computing device.

Advantageously, the third computing device is able to transparently intercept packets under surveillance as a result of the implementation of the at least one interception routing policy in the at least one element in the communication network and the preservation of the packet address of the one or more packets under surveillance. Various illustrative embodiments are provided for scenarios where the third computing device is local to the policy-enabled network element and where it is remote therefrom.

These and other objects, features and advantages will become apparent from the following detailed description of illustrative embodiments thereof, which is to be read in connection with the accompanying drawings.

DETAILED DESCRIPTION OF PREFERRED EMBODIMENTS

Figure 1:
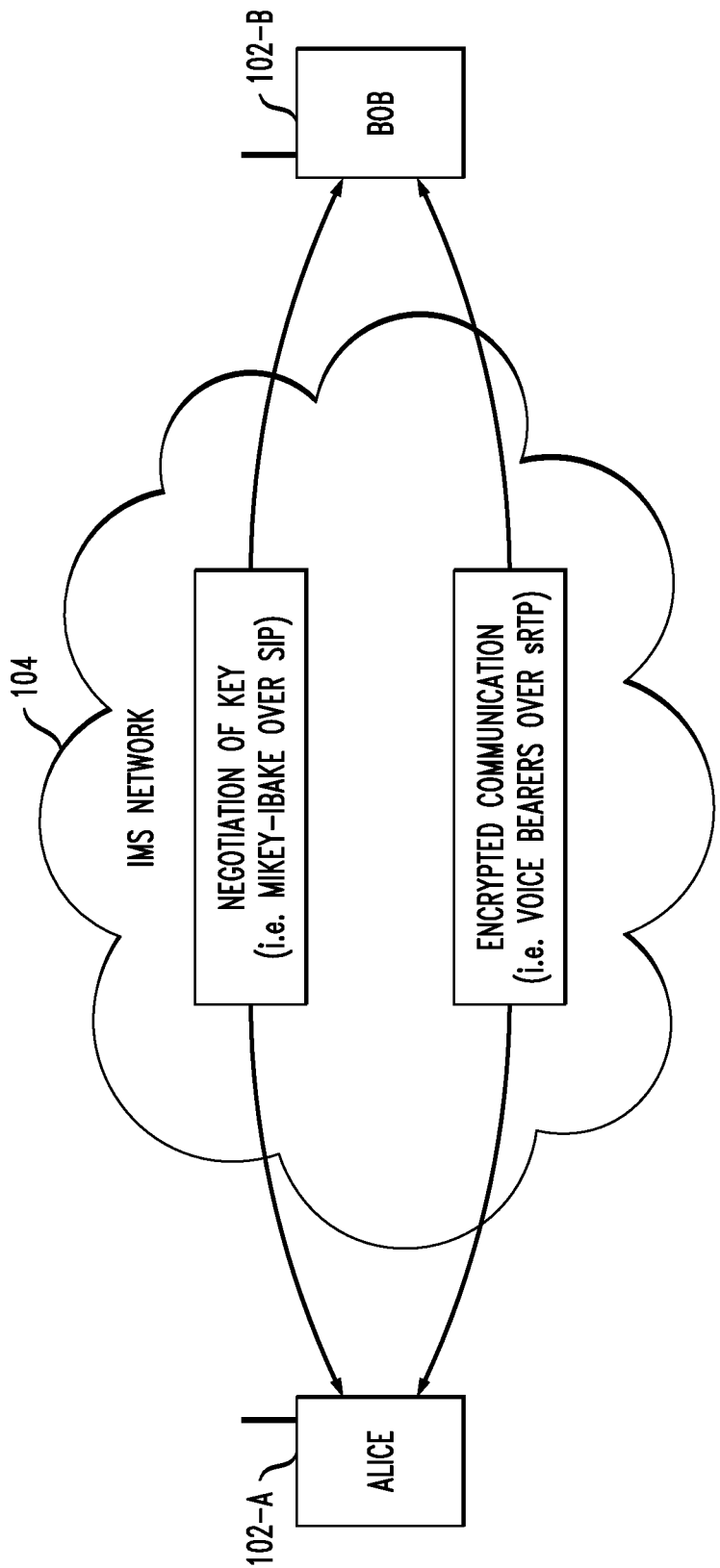
FIG. 1 illustrates end-to-end security of communications in a network using the MIKEY-IBAKE protocol for key negotiation.

The phrase "multimedia communication system" as used herein is generally defined as any communication system capable of transporting, over a media plane, one or more types of media involving, but not limited to, text-based data, graphics-based data, voice-based data and video-based data.

The phrase "media plane" as used herein is generally defined as the functional portion of the multimedia communication system in accordance with which the one or more types of media are exchanged between two or more parties in a call session. This is in contrast with a "control plane" which is the functional portion of the multimedia communication system in accordance with which call negotiation/scheduling is performed in order to establish the call session. Examples of media plane applications with which the inventive techniques can be used include, but are not limited to, Voice-over-IP (VoIP), Instant Messaging (IM), Video/Audio IM, Video Share, and Video-over-IP. It is understood that the media plane contains application layer traffic. However, the lawful security association discovery techniques described herein can be applied to any plane or layer of a communication system.

The term "key" as used herein is generally defined as an input to a cryptographic protocol, for purposes such as, but not limited to, entity authentication, privacy, message integrity, etc.

The phrase "security association" as used herein generally refers to a security definition in a communication environment across which two or more parties and/or devices communicate. In one example, the security definition may include, but is not limited to, a session key.

A "client" as used herein may generally refer to a communication device or some other computing system or device that allows one or more users, parties or entities to communicate in a communication environment with one or more other communication devices or other computing systems, such as another client. A "client" as used herein may also generally refer to an application or other computer program on a computing device. Thus, while the term client may be referred to below as a device, it is to be understood that the term client is not limited to hardware but may be software, or a combination thereof.

A "communication session" as used herein generally refers to a connection between at least two communication devices or other computing systems (e.g., clients) for the purpose of communication between the two devices. Thus, an "end-to-end" (EtE) communication session as used herein generally refers to the entire connection path from one device (e.g., client) to the other device (e.g., client). Also, the two or more clients that are participating in the communication session may be referred to as "end-point devices" or simple "end-points." However, it is to be appreciated that the term "end-point" could be an element in some network other than a client device. For example, when a call goes over to a PSTN, encryption may have to be terminated in a gateway element since legacy phones do not typically support end-to-end encryption. In fact, the gateway could be on another network. Nonetheless, we still consider this EtE communication between a client endpoint and a gateway endpoint. Accordingly, the lawful security association discovery techniques described herein can be applied to any computing or communication device, and not just to a client.

An "application" (or "application program") as used herein generally refers to one or more computer programs which, when executed, perform one or more given functions.

The term "lawful" (or "legal") as used herein is generally defined as satisfying one or more compliance requirements or guidelines associated with a governmental or private authoritative entity. Such authoritative entity may serve a law enforcement function or a non-law enforcement function. That is, the term lawful (legal) is not intended to be limited to law enforcement but rather may also include compliance in a non-law enforcement sense.

For instance, it is realized that enterprises have various compliance requirements regarding information technology (IT) records retention and details of transactions related to various applications. It is also realized that communications applications are becoming an increased part of this portfolio of applications thanks to convergence, and with EtE encryption, we need a transparent way to obtain keys. Also, conversations are increasingly being recorded by call centers and we are often told they are recorded—but not all conversations are recorded. This coupled with EtE (due to the fact that end-points are typically in different networks and physically may be in two different countries), makes it important to provide functionality to "selectively intercept" in a transparent manner. This is not a legal requirement, but becoming increasingly important.

Embodiments of the invention will be described herein in the context of an illustrative network environment such as IMS and LTE. However, it is to be understood that embodiments of the invention are not limited to such networks and can be implemented in other communication systems. That is, embodiments of the invention are applicable to any suitable communication network with end-to-end key generation and subsequent encryption of communications where there is a need to be able to provide lawful interception (discovery) in a way that is effectively non-detectable by the end-points of the communication.

As mentioned above, it is known that an end-to-end encrypted session can be created in a network, such as an IMS network, such that even if a party were able to read all the communication between two end-points, they would still not be able to readily decrypt the bearer flows. An example of a security association generation protocol which accomplishes this goal is the MIKEY-IBAKE (Multimedia Internet KEYing-Identity Based Authentication Key Exchange) protocol described in Internet Engineering Task Force (IETF) RFC 6267 draft dated Apr. 7, 2010, the disclosure of which is incorporated by reference herein.

The MIKEY-IBAKE protocol is a key management protocol variant, using the MIKEY protocol framework, which relies on a trusted key management service. In particular, the variant utilizes an IBAKE key exchange framework which allows the participating clients to perform mutual authentication and derive a session key in an asymmetric identity based encryption framework. This framework, in addition to providing mutual authentication, eliminates the key escrow problem that is common in standard Identity Based Encryption and provides perfect forward and backwards secrecy.

FIG. 1 illustrates end-to-end security of communications in an IMS network via the MIKEY-IBAKE protocol. As generally shown, a first end-point (computing device) 102-A (denoted as "Alice") negotiates the generation of a session key with a second end-point (computing device) 102-B (denoted as "Bob") over IMS network 104 using the above-referenced MIKEY-IBAKE protocol. As is known, the MIKEY-IBAKE key generation is implemented using the Session Description Protocol (SDP) described in IEFT RFC 2327, which is part of the Session Initiation Protocol (SIP) described in IETF RFC 3261, the disclosures of which are incorporated by reference in their entireties herein.

With the session key established using the MIKEY-IBAKE protocol, encrypted communications can be exchanged across the IMS network 104 between end-point 102-A and end-point 102-B. As is known, such communication (e.g., referred to as voice bearer flows or voice bearers when the application being secured is voice) can be exchanged in accordance with the Secure Real-time Transport Protocol (SRTP) described in IETF RFC 3711, the disclosure of which is incorporated by reference in its entirety herein.

One way to provide lawful interception of communications in the type of architecture shown in FIG. 1 is to introduce a lawful interception server (LIS) that has the ability to impersonate each end-point such that each of the end-points believes that it is signaling and communicating to the other, but in reality, its opposite party is the LIS. In such an interception approach, two security associations are established; a first security association (security association 1) between end-point 102-A and the LIS, and a second security association (security association 2) between end-point 102-B and the LIS.

Figure 2:
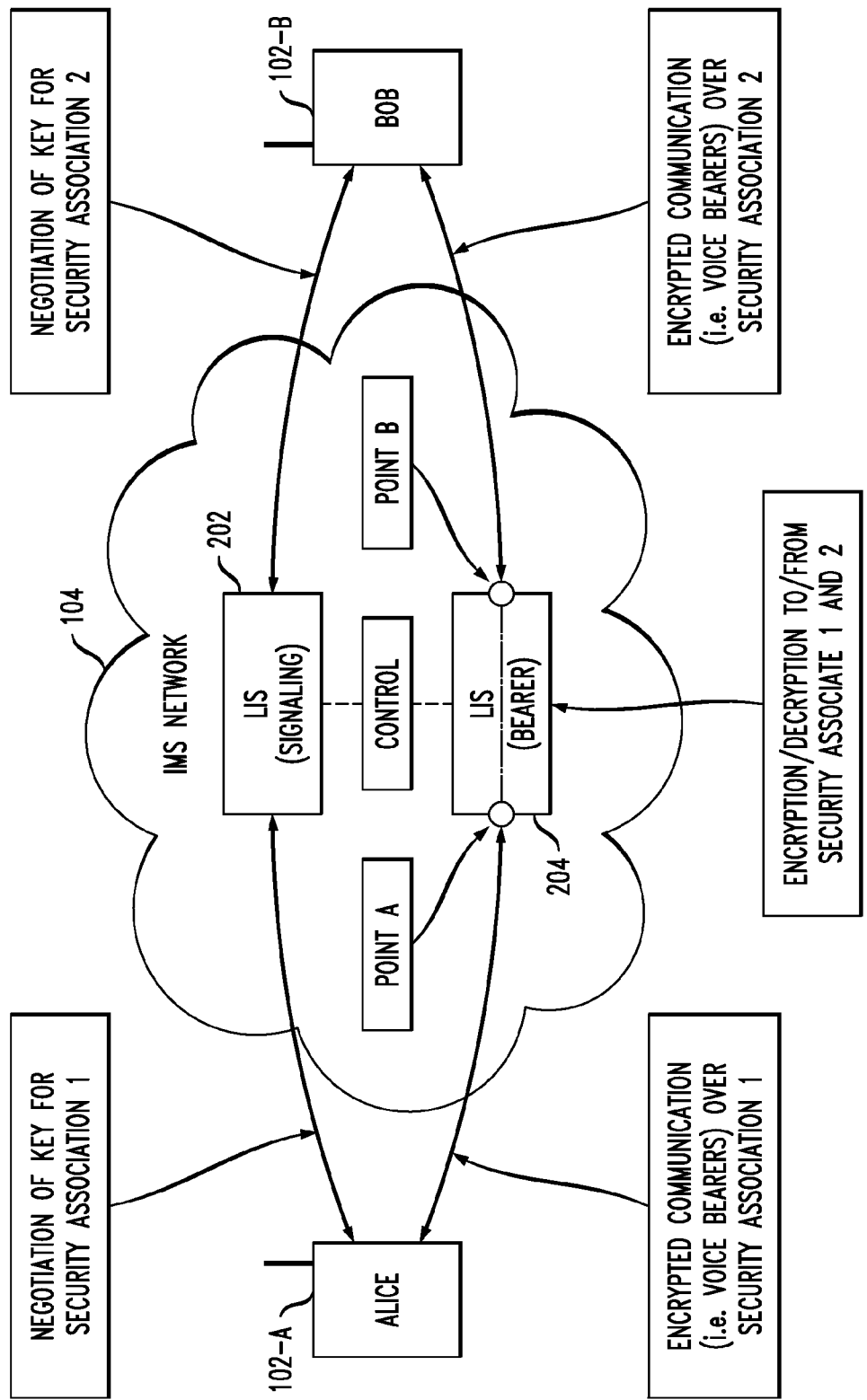
FIG. 2 illustrates an example approach to lawful interception in a network with end-to-end security of communications.

FIG. 2 illustrates an example approach where a LIS in the IMS network 104 is interposed between end-point 102-A and end-point 102-B. It is to be understood that this is one example approach wherein the LIS is acting as a man-in-the-middle (MITM). Note that the LIS in FIG. 2 is shown as being divided between a LIS signaling element 202 and a LIS bearer element 204.

As shown, the LIS signaling element 202 (of the LIS) establishes security associations 1 and 2, respectively, with end-point 102-A and end-point 102-B. This can be done using the above-referenced MIKEY-IBAKE protocol. Then, encrypted communications associated with the two security associations pass through the LIS bearer element 204 (of the LIS). Such encrypted communications are exchanged via SRTP. The LIS can decrypt an incoming message, intercept its content, and then encrypt the message and send it to its destination. For example, assuming a message is encrypted by end-point 102-A, the bearer element 204 receives and decrypts the message knowing security association 1, reads the content, and then encrypts the message knowing security association 2 and sends it to end-point 102-B.

Unfortunately, in this example LIS approach for lawful interception shown in FIG. 2, the end-points can detect that there is a LIS 202/204 in the middle of their communication session. End-point 102-A easily detects that the bearer traffic that should be coming directly from end-point 102-B is actually coming from point A (the LIS). End-point 102-B easily detects the same situation with respect to point B (again, the LIS).

Figure 3:
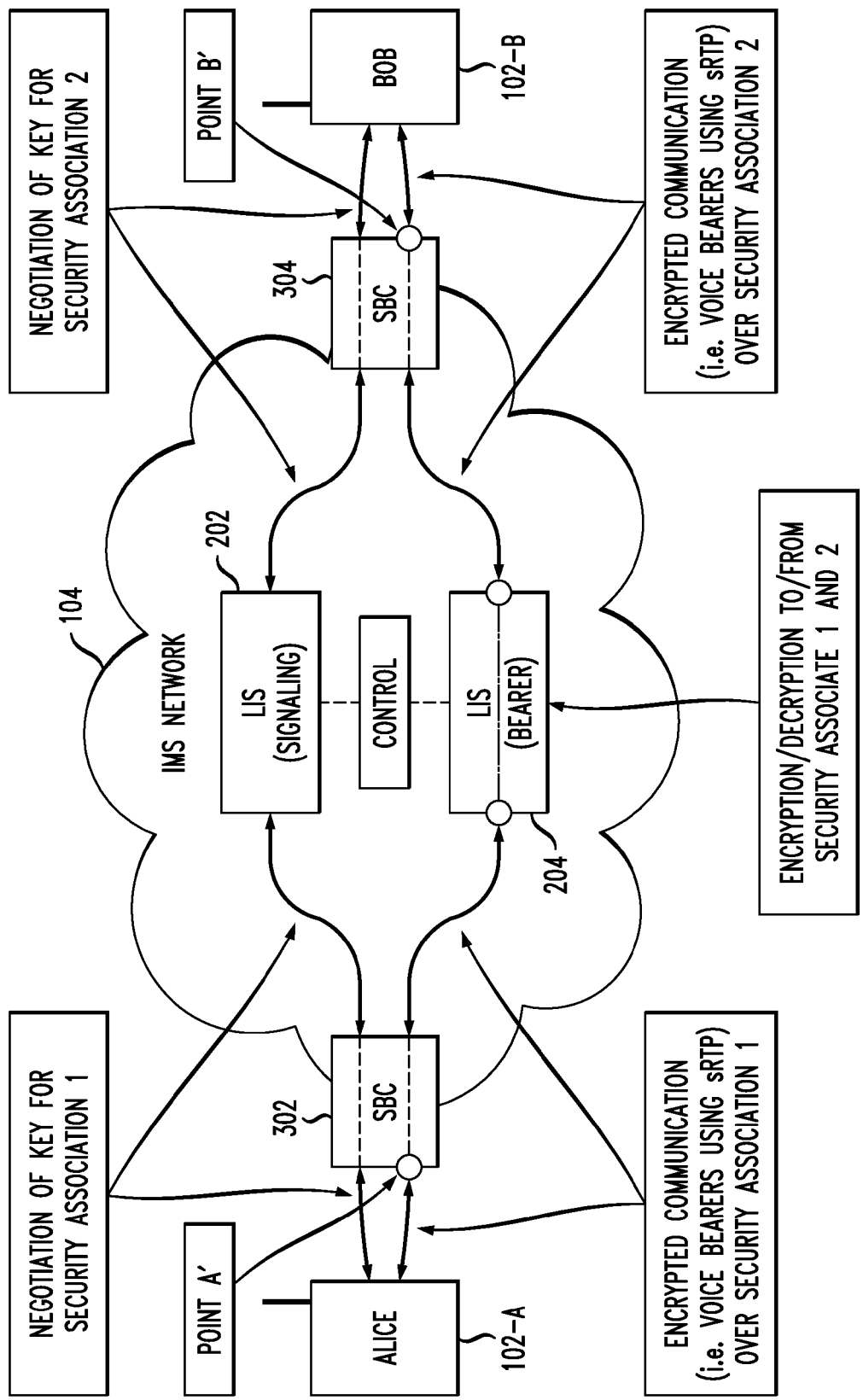
FIG. 3 illustrates an approach to lawful interception with session border controllers in a network with end-to-end security of communications.

FIG. 3 illustrates an approach to lawful interception with session border controllers that are intended to overcome the detectability problem of the basic approach of FIG. 2. To be able to hide the existence of a LIS element, session border controllers (SBCs) are introduced at the respective edges of the IMS network 104 as shown in FIG. 3. That is, SBC 302 is shown interposed between end-point 102-A and the LIS 202/204, while SBC 304 is shown interposed between end-point 102-B and the LIS 202/204. For example, the introduction of SBC 302 results in all traffic that end-point 102-A receives passing through SBC 302 (point A'). Thus, the introduction of the LIS 202/204 does not change the Internet Protocol (IP) address since the LIS is hidden behind the SBC. SBC 304 hides the LIS in the same way (through point B') with respect to end-point 102-B.

The introduction of SBCs to an IMS network is useful. However, it has drawbacks. The SBC based solution drawback is that it is quite costly to the operator of the IMS network from a capital and operations cost viewpoint. Often times the dominant cost items within an IMS network are the SBC elements.

To overcome these and other drawbacks, illustrative embodiments of the invention provide for instructing one or more control network routers or switches, other network devices and/or elements to re-direct the bearer flows that respectively originate at each of the subject end-points to the LIS. This is generally accomplished by implementing one or more routing policies (one or more "lawful interception routing policies") at one or more of these network routers or switches, other network devices and/or elements that instructs the device/element to route traffic to/from an Internet Protocol (IP) address and assigned port(s) of a subject under surveillance to the LIS. Advantageously, this conceals the existence of an active LIS element used for lawful intercept purposes from practical detection by the subject end-point(s).

Illustrative embodiments of the invention envision a wide variety of ways to render the LIS undetectable to the subject(s) under surveillance (end-points) and the communication network itself, for example, in scenarios where the LIS is collocated with the routing device/element (e.g., in local area network) and scenarios where the LIS is remote from the routing device/element (e.g., somewhere else in the communication network or in another network).

Figure 4:
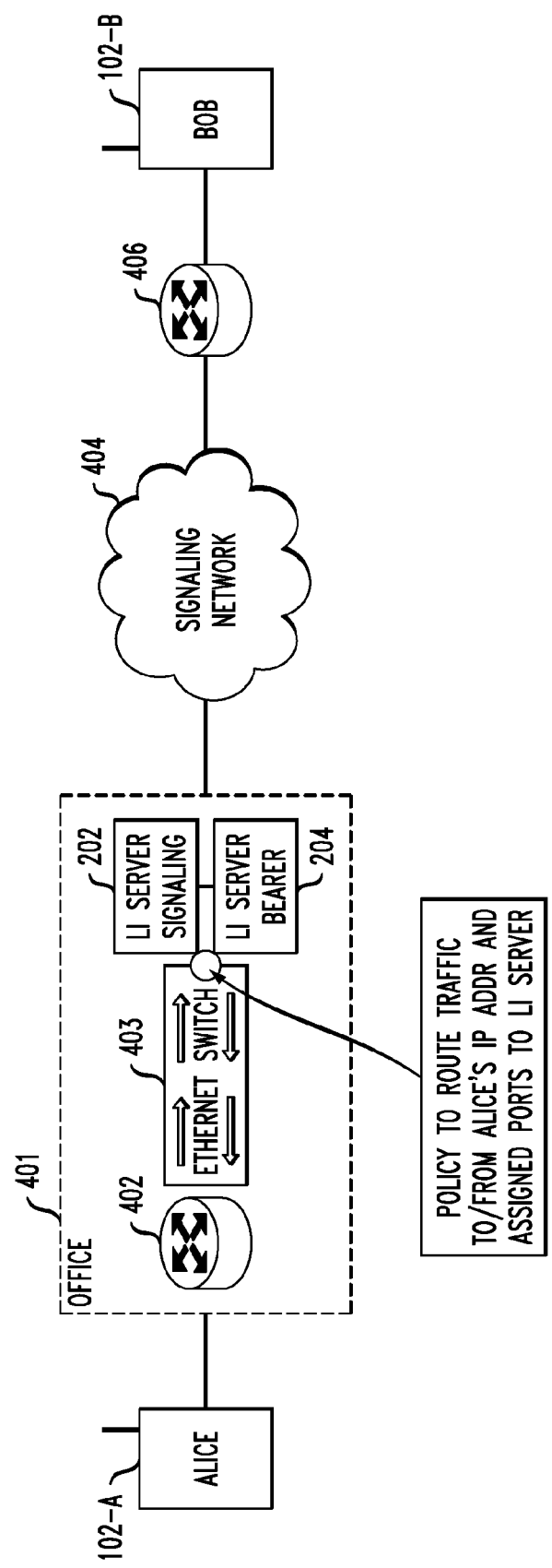
FIG. 4 illustrates a methodology for policy routing-based lawful interception of communications in a network with end-to-end security, according to a first embodiment of the invention.

FIG. 4 shows an illustrative case where the LIS (i.e., the LIS signaling element 202 and the LIS bearer element 204) is connected in the same local area network (LAN) with the routing device/element that maintains the lawful interception routing policy. As shown, it is assumed that the LIS 202/204 is collocated on a common LAN (at "office" 401) with a router 402 and an Ethernet switch 403. In this embodiment, the Ethernet switch 403 maintains a policy to route traffic to/from the IP address and assigned port(s) of end-point 102-A to the LIS 202/204. Note that the office 401 is connected to signaling network 404 which is connected to router 406. Router 406 is connected to end-point 102-B. It is assumed that "Alice" is the subject under surveillance in this example; however, the LIS could be collocated with router 406 to lawfully intercept "Bob's" traffic. It is also to be understood that the Ethernet switch is only one example of a network device/element upon which the lawful interception routing policy may be maintained. Advantageously, with the introduction of the lawful interception routing policy in at least one of the network devices/elements, the presence of LIS signaling and bearer elements is made transparent to the rest of the mobile infrastructure.

Figure 5:
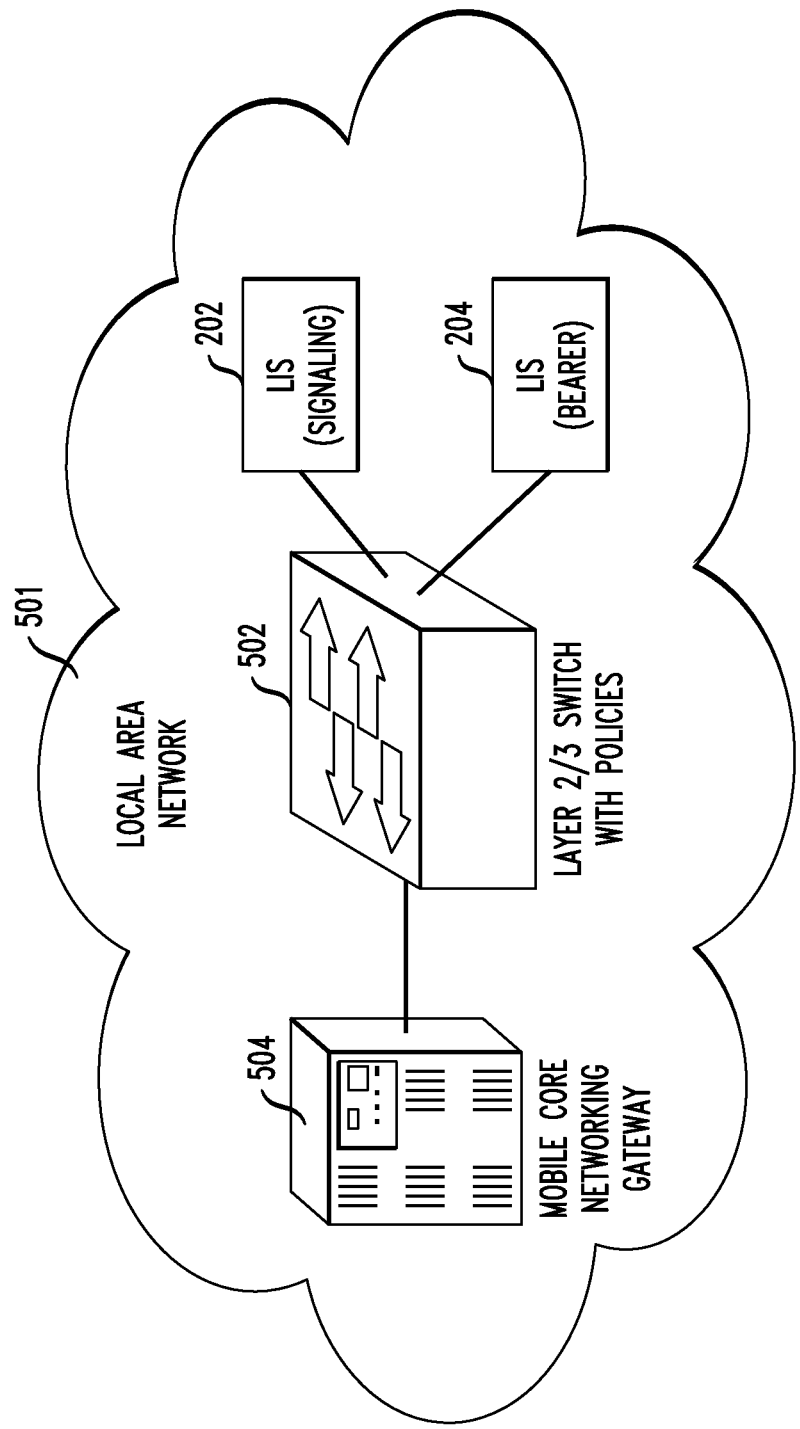
FIG. 5 illustrates a methodology for policy routing-based lawful interception of communications in a network with end-to-end security, according to a second embodiment of the invention.

FIG. 5 shows another example where the relevant network elements are all part of a local area network (LAN). The figure illustrates a LAN 501, which could be the LAN in the "office" 401 shown in FIG. 4. The LAN 501 includes a layer 2/3 switch 502 along with a mobile gateway 504 (which handles all bearer and signaling packets in that region). It is known that "layer 2/3" refers to the Open Systems Interconnection (OSI) model where layer 2 is the "data link layer" and layer 3 is the "network layer." Thus, the layer 2/3 switch is a data packet switch that operates at these two layers.

In this setting, LIS signaling and bearer entities 202/204 can then connect to the same LAN (for instance to separate ports on the same switch) and all packets under surveillance will then be forwarded through to the appropriate LIS network element by modifying the forwarding (or routing) tables in the switch. The modification of the forwarding tables constitutes the implementation of the lawful interception routing policy in this particular embodiment. For instance, assume that Alice (end-point 102-A) is under surveillance and suppose that she is anchored at the mobile gateway 504. Under normal circumstances, all packets of all users anchored at gateway 504 will pass through that gateway. The mobile gateway 504 is part of LAN 501 with the mobile gateway physically connected to a port on the layer 2/3 switch 502. Hence, packets to and from the gateway 504 will also have to pass through the switch 502. Assuming the switch 502 is a lawful interception routing policy-enabled switch (i.e., a lawful interception routing policy in accordance with an embodiment of the invention is implemented and maintained thereon) and that Alice is the one under surveillance, this will force packets to and from Alice, i.e., between the mobile gateway and rest of the network, to go through the LIS 202/204.

Alternatively, such policies can also be at least partially embedded in the LIS infrastructure 202/204. In this embodiment, all packets to or from the gateway 504 can be forced to go through the LIS infrastructure by reconfiguring forwarding tables in the layer 2/3 switch. However, the policy engines in the LIS infrastructure will then decide whether to examine a given packet or not. Of course, in a further alternative embodiment, the LIS functions themselves (signaling and bearer element functions) could be implemented on the same computing device in which the layer 2/3 switch is implemented, in which case, the routing policy is considered to be fully implemented on the LIS itself.

Once it receives the subject packets, the LIS copies the packets before forwarding them toward the packet destination (in this example, Bob). The LIS can then decrypt the copied packets (with knowledge of the encryption key) or it can forward the copied packets to another entity for decryption, e.g., law enforcement.

Note also that the LIS preserves the header information of the packets, in particular (but not limited to), the source and destination IP addresses of the packets, so that the forwarded packets appear to the destination to have come from the source rather than from the LIS. This can be accomplished by the LIS, which preferably operates at the application layer, containing logic (hardware, software, and/or a combination thereof) that ensures preservation of the original packet header information.

Thus, assuming an embodiment where the LIS decrypts packets from end-point 102-A, the LIS makes a copy of the decrypted packets and forwards the copy to a law enforcement (in real time), and re-encrypts the original packets and sends them on to the destination end-point 102-B. The LIS does this processing all the while preserving the original packet headers (IP addresses, TCP ports, etc. . . . ). Alternatively, assume an embodiment where the LIS recreates a pseudorandom number (using a PRG generator) that was used by end-point 102-A in the key exchange and hence is able to determine the session key used by end-point 102-A and 102-B to encrypt packets. In this approach, the LIS can make a copy of the encrypted packets from end-point 102-A, and send the copy to law enforcement along with the key. The LIS would forward the original packets, as is, to end-point 102-B (again, note that the IP source address and other header information is advantageously preserved).

Advantageously, the existence of the LIS infrastructure is transparent to the rest of the network infrastructure, in particular (but not limited to), end-points 102-A and 102-B. Moreover, packets to and from end-point 102-A will go through appropriate devices/elements without the end-point learning that they were forwarded through LIS network elements.

Note also that due to this transparency of the LIS, and the approach of modifying the forwarding tables of at least one network element to realize the lawful interception routing policy mentioned above whereby the packets under surveillance are forwarded to the LIS, the approach shown in FIG. 5 is called a layer 2/3 transparent overlay proxy approach.

Figure 6:
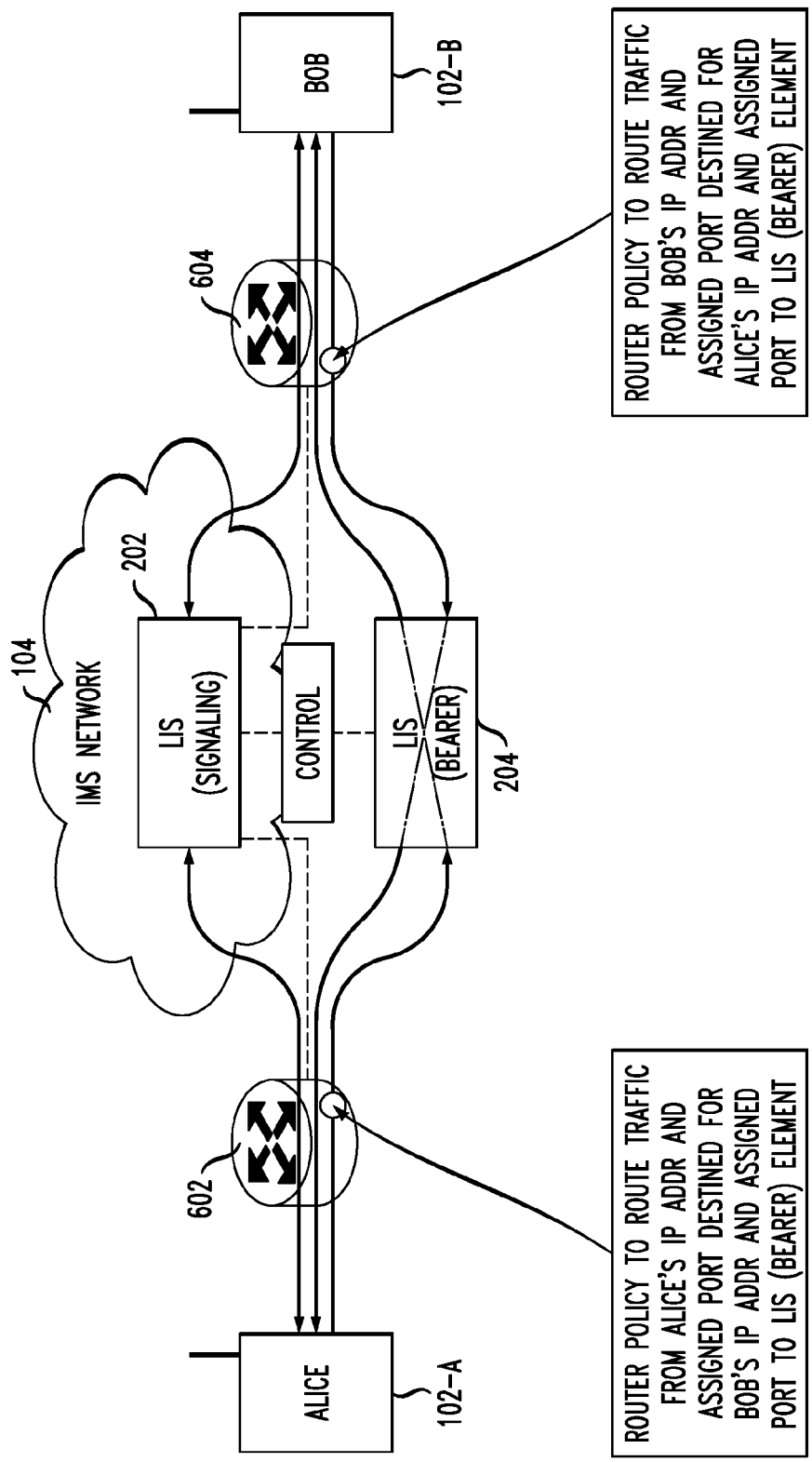
FIG. 6 illustrates a methodology for policy routing-based lawful interception of communications in a network with end-to-end security, according to a third embodiment of the invention.

FIG. 6 generally shows the scenario where forwarding of packets cannot be accomplished in a common LAN as depicted and described above in the context of FIGS. 4 and 5. Rather, as shown in FIG. 6, the LIS 202/204 is assumed to be remote from the network device/element upon which the lawful interception routing policy is implemented and maintained. That is, network device/element 602 maintains the lawful interception routing policy and is connected between end-point 102-A and LIS 202/204, while network device/element 604 maintains the lawful interception routing policy and is connected between end-point 102-B and LIS 202/204. Thus, network devices/elements 602 and 604 are considered to be "policy-enabled routers."

In such scenarios, in accordance with further embodiments of the invention, one or more virtual private network (VPN) tunnels between the policy-enabled device/element and the relevant LIS network element can be established. This VPN tunnel approach is illustrated in several embodiments in the context of FIGS. 7 through 11. Recall that VPN protocols are mechanisms to provide secure and reliable transport for packet flows across IP networks, and they use various tunneling (or encapsulation) protocols to ensure packets flow through a "private network" (or more generally a well-defined path).

Note that the use of a VPN ensures that the packets are directed to the LIS, when the policy dictates, and addresses the scenario when the policy-enabled network element (router) and the LIS are in two different locations. However, the use of a VPN alone is not necessarily sufficient for the LIS to mask that it is the one forwarding packets to the destination end-point, thus the same or similar header information preserving logic, mentioned above, is implemented in the LIS in this VPN approach in order to achieve LIS-transparency and undetectability.

More particularly, this VPN approach may be accomplished by the LIS controlling one or more network routers through one or more routing policies that re-direct the bearer flows that respectively originate at each of the subject end-points to one or more VPN tunnels that terminate at the LIS. The LIS then processes the packets but preserves the header information of the packets (whether or not the LIS decrypts the packets itself or sends them on to a law enforcement agency to do the decrypting).

Advantageously, this enables concealment of the existence of an active LIS element from practical detection by the subject end-points. The result is that when one of the subject end-points receives a packet, it appears as if the packet originated at the sending end-point instead of the LIS element. This is because, for instance, using known principles of VPN tunnel creation and implementation, the network routers encapsulate the subject packets and transmit them over the VPN tunnels established with the LIS, and the LIS preserves the IP address information for each flow and conceals the existence of the LIS as mentioned above. In this example, it is the tunneling principles of the VPN that are exploited, rather than the security aspects, in order to ensure the packets are routed to and from the LIS element without modifying source and destination IP addresses of the original packets in the signaling and bearer flows.

Thus, by way of example, in the event that the IMS network has received a legal request from law enforcement to intercept calls to or from one or both parties to a call (i.e., Alice and/or Bob in the running examples used herein), the network will detect the call set-up when Alice, e.g., sends the first message.

In one illustrative embodiment, the LIS could be a so-called man-in-the-middle (MITM) server such as a SIP B2BUA (back-to-back user agent). As is known, a B2BUA operates between both end-points of a call or communications session and divides the communication channel into two call legs and mediates all SIP signaling between both ends of the call, from call establishment to termination. In such a MITM embodiment, this allows the LIS to perform the role of creating a key with Alice under the pretense that the MITM server is Bob, and vice versa. Subsequently, bearer streams (i.e., traffic packets) may be shared with law enforcement.

Of course, it is to be understood that the LIS is not limited to being a MITM server or SIP B2BUA. Due to the wide flexibility as to where the lawful interception routing policies according to embodiments of the invention can be implemented and maintained, any network device/element in any appropriate location in the network can assume the role of the LIS. Thus, in the embodiments of FIGS. 7-11 to follow, the lawful interception function is generally depicted as the LIS.

Figure 7:
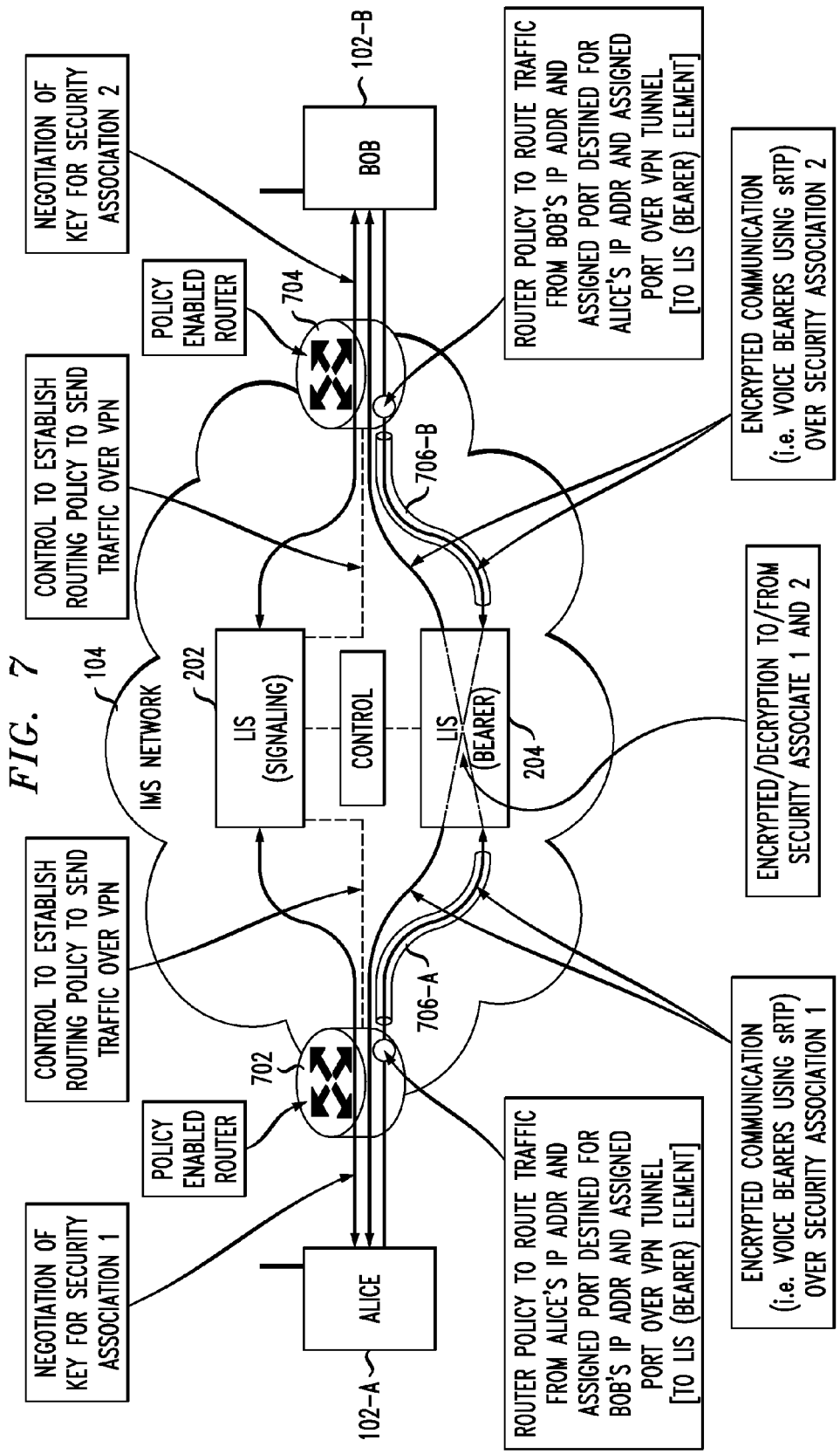
FIG. 7 illustrates a methodology for policy routing-based lawful interception of communications in a network with end-to-end security, according to a fourth embodiment of the invention.

A first illustrative VPN tunnel embodiment is shown in FIG. 7. As shown, end-points 102-A (Alice) and 102-B (Bob) are client devices that, as mentioned above, support SIP signaling per IMS network standards along with MIKEY-IBAKE message exchanges for setting up security associations, and SRTP for the transport of bearer information.

Policy-enabled routers 702 and 704 are the network routers mentioned above that are controlled by the LIS 202/204 to re-direct the bearer flows that respectively originate at each of end-points 102-A and 102-B to a VPN tunnel 706 that terminates at the LIS 202/204. Note that, as shown, 706-A is the part of the VPN tunnel that is established from end-point 102-A to the MITM server and 706-B is the part of the VPN tunnel that is established from end-point 102-B to the MITM server. Of course, two separate VPN tunnels could be established, in which case, 706-A is considered one VPN tunnel and 706-B is considered another VPN tunnel. It is to be appreciated that while two policy-enabled routers 702 and 704 are shown in FIG. 7, one policy-enabled router could be employed depending on the geographic location of the two end-points participating in the subject communication session.

Policy-enabled router 702 maintains a router policy that forwards traffic from Alice's IP address and assigned port destined for Bob's IP address and assigned port over VPN tunnel 706-A to the LIS (LIS signaling element). Likewise, policy-enabled router 704 contains a router policy to route traffic from Bob's IP address and assigned port destined for Alice's IP address and assigned port over VPN tunnel 706-B to the LIS (LIS signaling element).

As explained above, the LIS is comprised of the LIS signaling element 202 and the LIS bearer element 204. Note that while the LIS signaling element and the bearer element are shown separately, they may be physically collocated on the same computing device (but, regardless, are collectively referred to as the LIS).

Note also that it is assumed that the IMS network 104 includes (but does not expressly show) the typical IMS elements including a P-CSCF (proxy-call session control function), an I-CSCF (interrogating-call session control function), an S-CSCF (serving-call session control function) and an HSS (home subscriber server). One of ordinary skill in the art will understand the interconnectivity and functionality of these typical IMS elements.

It is also assumed, for the example scenario when the LIS is a MITM server/B2BUA, that security associations 1 and 2 are respectively established by the LIS for end-points 102-A and 102-B in accordance with the MIKEY-IBAKE protocol as explained above. However, as explained above, embodiments of the invention are not limited to the LIS being implemented as a MITM server or B2BUA.

By way of one example, the interactions between elements in FIG. 7 needed for an interception of a communication flow are as follows:

(1) End-point 102-A sends signaling information requesting a session (e.g., voice) with end-point 102-B and includes, in the SDP (Session Description Protocol IEFT RFC 2327, the disclosure of which is incorporated by reference in its entirety herein), a Message 1 of the MIKEY-IBAKE protocol as described in the above-referenced IEFT RFC 6267.

(2) The IMS network 104 detects the need for intercepting the call, and it routes the signaling to the LIS signaling element 204.

Figure 8:
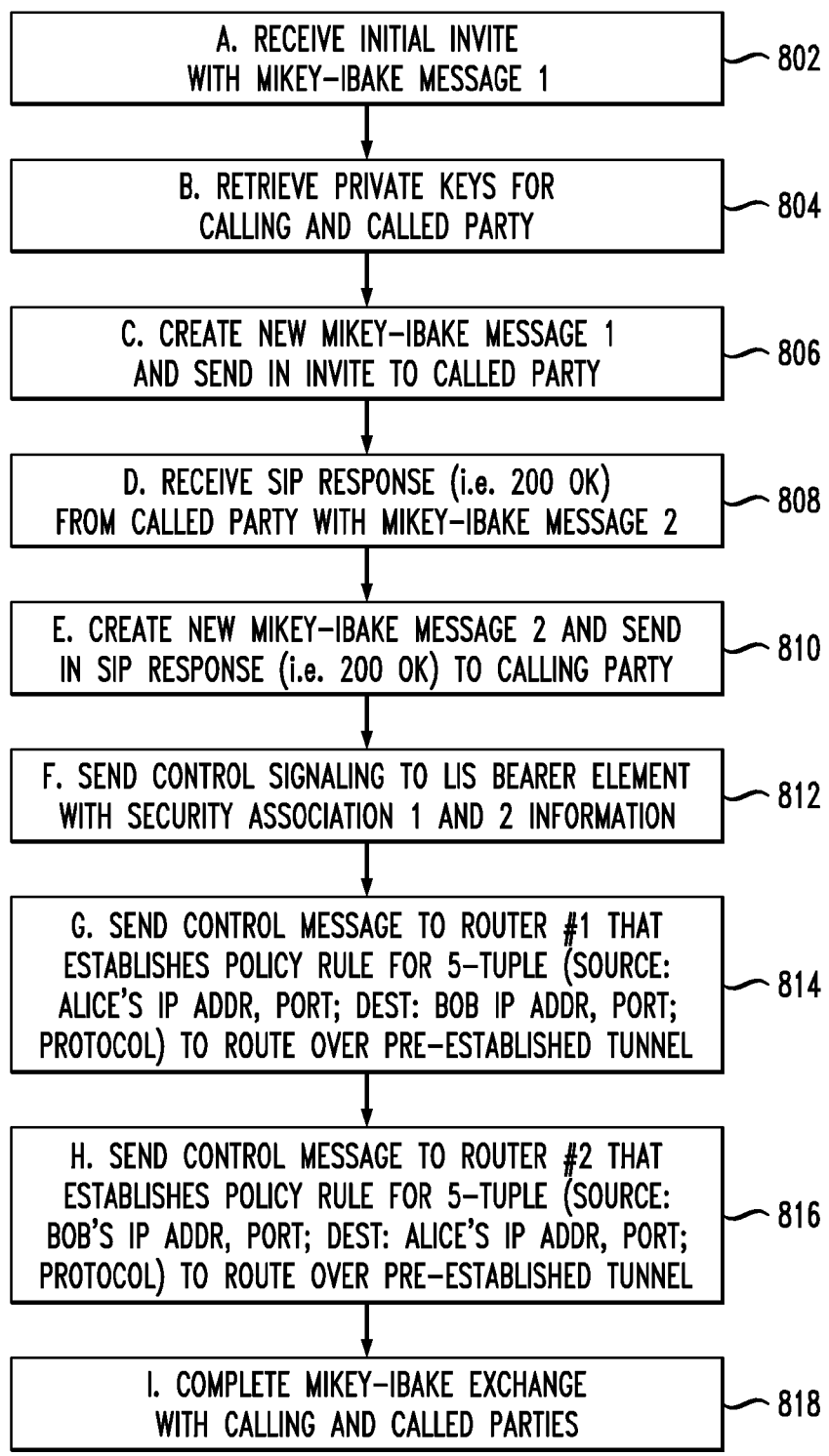
FIG. 8 illustrates a methodology for policy routing-based lawful interception of communications in a network with end-to-end security, according to a fifth embodiment of the invention.

(3) The LIS signaling element 204 executes the flow as shown in FIG. 8 (and as will be described below). This flow enables end-point 102-A to believe it is interacting directly with end-point 102-B, and vice versa, even though they are both dealing directly with the LIS (signaling and bearer) element(s).

(4) SRTP packets originating from end-point 102-A are redirected by the policy-enabled router 702 to VPN tunnel 706-A that terminates on the LIS bearer element 204, while SRTP packets originating from end-point 102-B are redirected by the policy-enabled router 704 to VPN tunnel 706-B that terminates on the LIS bearer element 204.

(5) The LIS bearer element 204 uses the security association information received in the flow of FIG. 8 (to be described below) to decrypt the SRTP packets received from end-point 102-A (security association 1), save clear media (unencrypted packets), and then encrypt them using security association 2 and send them to end-point 102-B. The same procedure, but with the security associations reversed is applied for SRTP packets received from end-point 102-B destined for end-point 102-A. SRTP packet headers are retained by the LIS bearer element 204 and used when sending of the SRTP packets. These packets do not have to use the tunnel(s) in step 4 above.

The control interface between the LIS signaling element 202 and the policy-enabled router can be as simple as a CLI (Command Line Interface) or more flexible interfaces such as a SOAP (Simple Object Access Protocol) API (Application Programming Interface). The discovery of the correct policy-enabled router for the LIS signaling element to interface with preferably uses existing mechanisms within the IMS network. The control protocol between the LIS signaling element and the LIS bearer element is preferably SIP with an application control layer such as an enhanced MSCML (Media Server Control Markup Language), but could be another control protocol such as H.248 or proprietary. The P-CSCF removes from the SIP messages any indication of the LIS signaling element before sending it to the end users.

Referring now to FIG. 8, an example flow that is executed by the LIS signaling element (204 in FIG. 7) is shown. Here in this figure, it is assumed that the LIS is a MITM server (B2BUA). However, as stated above, embodiments of the invention are not limited to the LIS being a MITM server (B2BUA).

In step 802, the MITM signaling element receives the initial INVITE with MIKEY-IBAKE Message 1 (IETF RFC 6267) from the calling party (assume end-point 102-A).

The LIS signaling element retrieves, in step 804, the private keys for the calling party (end-point 102-A) and the called party (assume end-point 102-B). The private keys may be obtained from one or more key management servers (KMS, not expressly shown) associated with the subject end-points.

In step 806, the LIS signaling element creates a new MIKEY-IBAKE Message 1 and sends it in INVITE to the called party (end-point 102-B).

In step 808, the LIS signaling element receives a SIP response (e.g., 200 OK) from the called party (end-point 102-B) with MIKEY-IBAKE Message 2.

The LIS signaling element creates, in step 810, a new MIKEY-IBAKE Message 2 and sends it in a SIP response (e.g., 200 OK) to the calling party (end-point 102-A).

In step 812, the LIS signaling element sends control signaling to the LIS bearer element (204 in FIG. 7) with security association 1 and 2 information).

In step 814, the LIS signaling element sends a control message to router 1 (702 in FIG. 7) that establishes a policy rule for a 5-tuple (Source: Alice IP Addr, Port; Dest: Bob IP Addr, Port; protocol) to route over the pre-established tunnel (706-A in FIG. 7), where again Alice is end-point 102-A and Bob is end-point 102-B.

In step 816, the LIS signaling element sends a control message to router 2 (704 in FIG. 7) that establishes a policy rule for a 5-tuple: (Source: Bob IP Addr, Port; Dest: Alice IP Addr, Port; protocol) to route over the pre-established tunnel (706-B in FIG. 7).

In step 818, the LIS signaling element completes the MIKEY-IBAKE exchange with the calling and called parties (end-points 102-A and 102-B, respectively).

Figure 9:
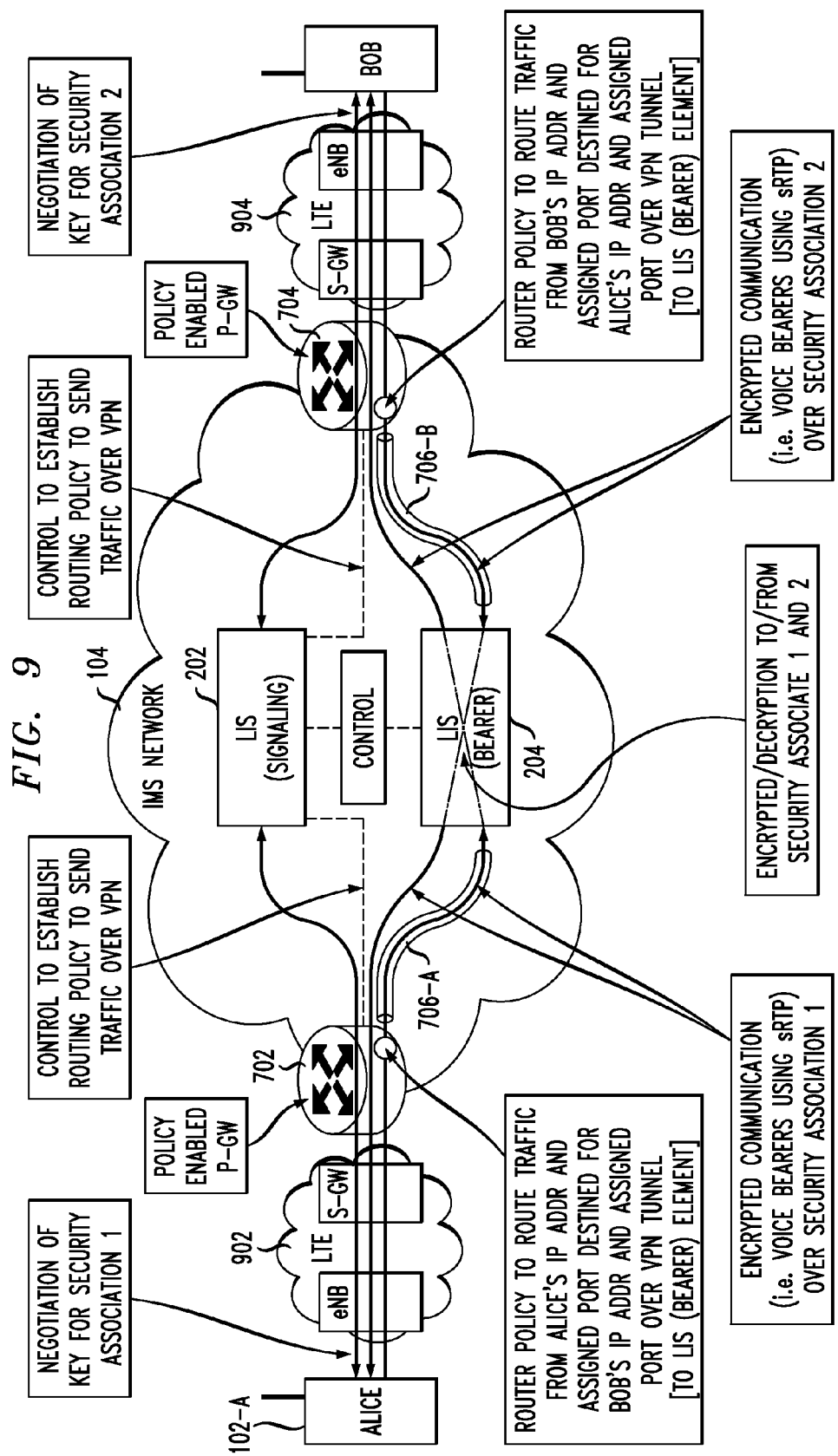
FIG. 9 illustrates a methodology for policy routing-based lawful interception of communications in a network with end-to-end security, according to a sixth embodiment of the invention.

A second illustrative VPN tunnel embodiment is shown in FIG. 9. In this embodiment, it is assumed that the end-points 102-A and 102-B access the IMS network 104 via an LTE access network, depicted as 902 and 904, respectively. It is known that the LTE (Long Term Evolution) network is a 3GPP-specified network that was developed to improve upon the UMTS (Universal Mobile Telecommunications System) standard and provide an enhanced user experience and simplified technology for next generation mobile broadband. LTE radio access technology is known as Evolved UMTS Terrestrial Radio Access (E-UTRA) and the network is known as an Evolved Packet System (EPS). It is to be understood that while an LTE access network is shown, the access network could be any other appropriate wireless (or even wireline) access network.

As generally depicted in the LTE network (902 and 904), an end-point connects with a base station (enB) associated with a serving gateway (S-GW). Accordingly, when an LTE access network, such as that shown, is employed, the policy-enabled routers 702 and 704 (which perform the functions described above in the context of FIGS. 7 and 8) are proxy gateways (P-GW).

Other than the policy-enabled routers being implemented as P-GWs in an LTE access network, lawful interception of communications between the two end-points (102-A and 102-B) operates in the same manner as described above in the context of FIGS. 7 and 8, i.e., advantageously employing a VPN tunnel, for example, to assist in concealing the LIS from the end-points.

Figure 10:
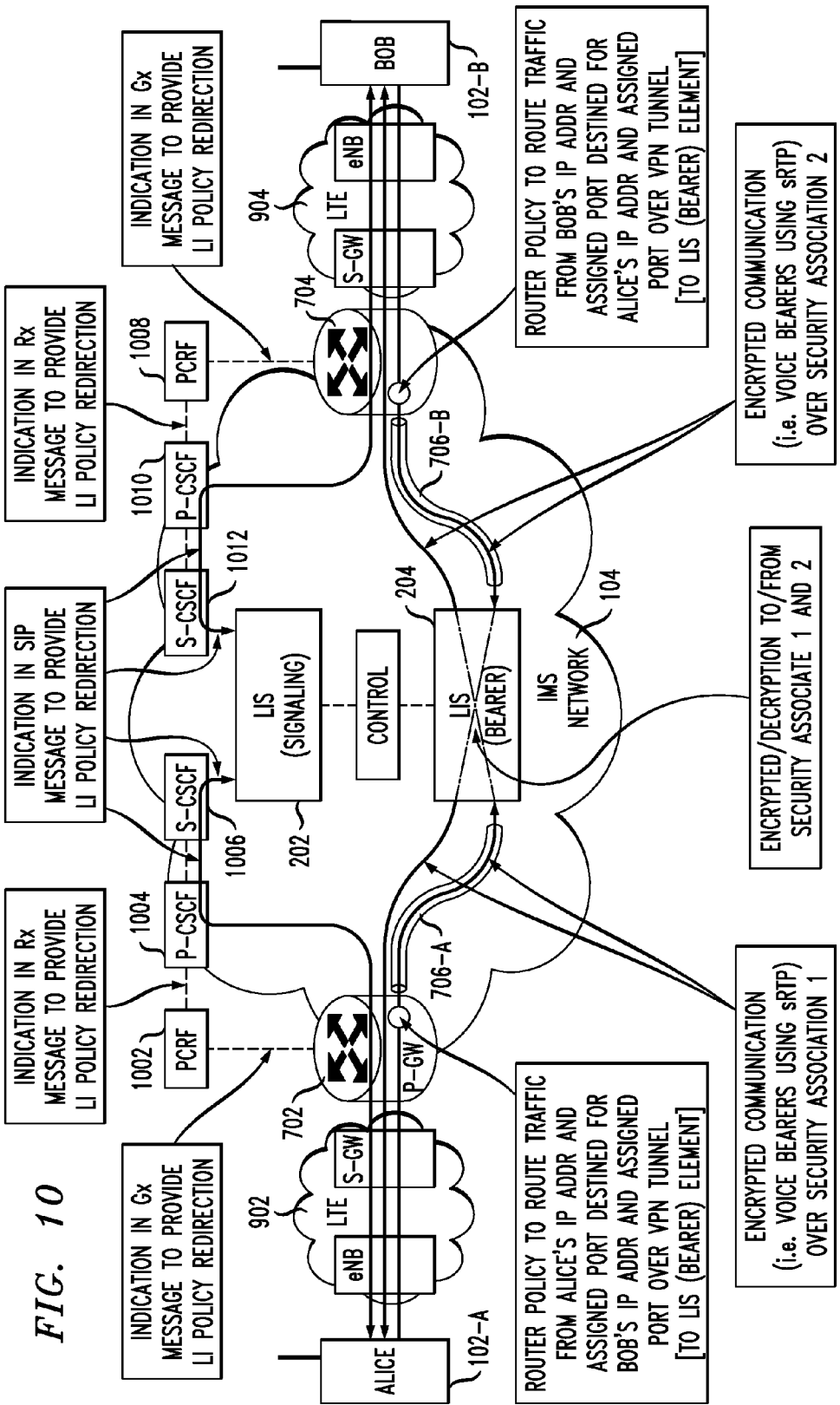
FIG. 10 illustrates a methodology for policy routing-based lawful interception of communications in a network with end-to-end security, according to a seventh embodiment of the invention.

A third illustrative VPN tunnel embodiment is shown in FIG. 10, and builds on the embodiment of FIG. 9. Again, an LTE access network is assumed but here the P-GW (702/704) is controlled via a policy and charging rules function (PCRF 1002/1008), and the PCRF receives indication to apply control via a Rx interface via a P-CSCF (1004/1010). In this embodiment, the flow in FIG. 8 for the LIS is modified to include indication in the SIP header for Lawful Intercept Policy Redirect. When the P-CSCF receives this indication in the SIP message from a S-CSCF (1006/1012), the CSCF provides indication over the Rx interface for Lawful Intercept Policy Redirect. The PCRF then provides a similar indication over the Gx interface to the P-GW. Note that a modification of this embodiment is for the PCRF to arm a pre-existing policy rule for routing to the tunnel using standard Gx interface without having to provide a custom Lawful Intercept Policy Redirect AVP (attribute value pair).

Figure 11:
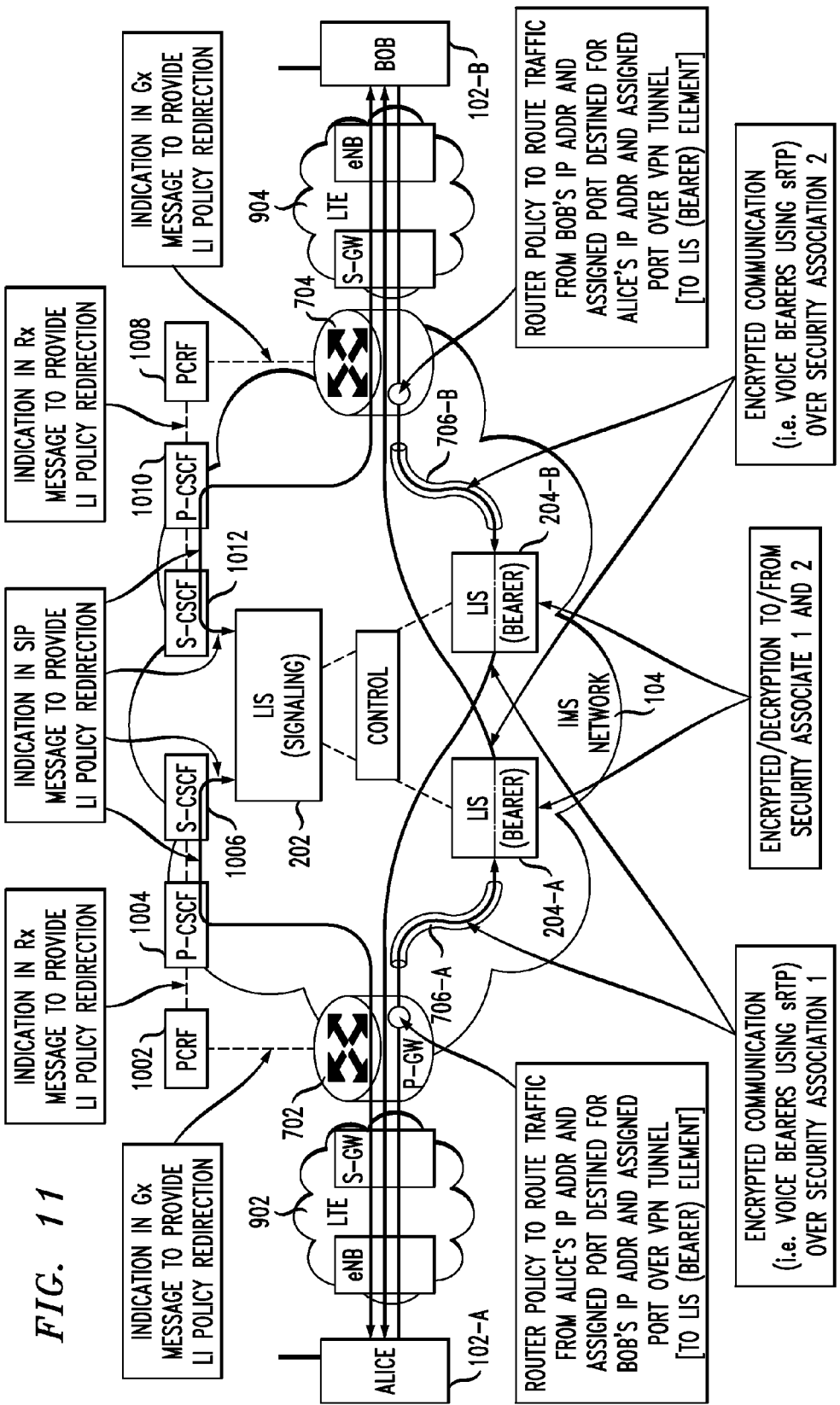
FIG. 11 illustrates a methodology for policy routing-based lawful interception of communications in a network with end-to-end security, according to an eighth embodiment of the invention.

A fourth illustrative VPN embodiment in FIG. 11 builds on the embodiment of FIG. 10. The LIS bearer is directly associated with a P-GW (or a set of P-GWs) in order to reduce the number of tunnels or the amount of transport of tunnels over a wide area network (WAN). In the embodiment of FIG. 11, assuming one end-point 102-A is served by one P-GW (702), while the other end-point 102-B is served by another P-GW (704), then two LIS bearer elements 204-A and 204-B are respectively involved in the lawful intercept. As shown, LIS bearer element 204-A captures the session that originates at end-point 102-A, while LIS bearer element 204-B captures the session that originates at end-point 102-B.

Advantageously, as explained in accordance with the embodiments above, illustrative principles of the invention enable the offering of an end-to-end communication session encryption service in a network that are subject to lawful intercept requirements, without requiring the inclusion of session border controllers (SBCs).

Figure 12:
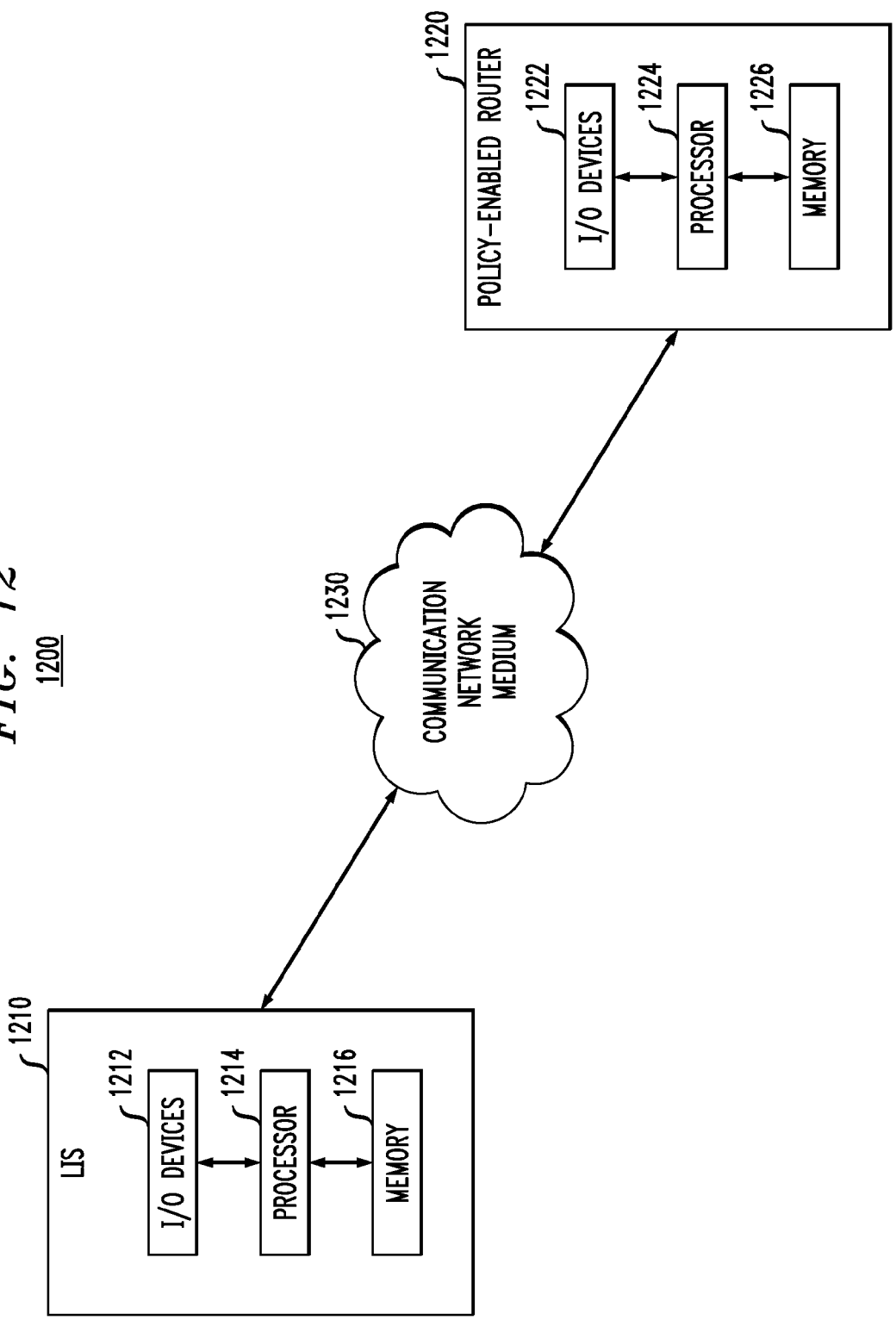
FIG. 12 illustrates a generalized hardware architecture of a data network and communication (computing) devices suitable for implementing one or more of the methodologies and protocols according to embodiments of the invention.

FIG. 12 illustrates a generalized hardware architecture of a network environment and communication devices in the form of computing devices suitable for implementing one or more methodologies according to example embodiments.

While FIG. 12 shows detailed subcomponents for only two of the illustrated entities, it is to be understood that other entities can have the same configuration. Thus, in terms of the lawful interception described above, the two entities shown in detail are the LIS server 202/204 and the policy-enabled router 702/704 (or layer 2/3 switch 502). However, end-points 102-A and 102-B, components in the LTE (or other) network 902/904, PCRFs 1002/1008, P-CSCFs 1004/1010, S-CSCFs 1006/1012, other functional elements, additional client devices (parties), additional servers, and additional network elements may be implemented with the same architecture as shown in a computing device of FIG. 12. However, it is to be understood that, for the sake of simplicity, all the computing devices (communication devices) that may participate in the protocols described herein are not shown in FIG. 12.

As shown, computing device (LIS) 1210 and computing device (policy-enabled router or layer 2/3 switch) 1220 are coupled via a network 1230. The network may be any network across which the devices are able to communicate, for example, as in the embodiments described above, the network 1230 could include a publicly-accessible wide area communication network such as, by way of example only, a cellular communication network operated by a network operator. Also, in the case of the LIS and policy-enabled device being collocated, network 1230 could be a LAN (e.g., 501 in FIG. 5). However, embodiments are not limited to a particular type of network.

As would be readily apparent to one of ordinary skill in the art, the computing devices may be implemented as programmed computers operating under control of computer program code. The computer program code would be stored in a computer readable storage medium (e.g., a memory) and the code would be executed by a processor of the computer. Given the present disclosure, one skilled in the art could readily produce appropriate computer program code in order to implement the protocols described herein.

Nonetheless, FIG. 12 generally illustrates an exemplary architecture for each computer system communicating over the network. As shown, device 1210 comprises I/O devices 1212, processor 1214, and memory 1216. Device 1220 comprises I/O devices 1222, processor 1224, and memory 1226. It should be understood that the term "processor" as used herein is intended to include one or more processing devices, including a central processing unit (CPU) or other processing circuitry, including but not limited to one or more signal processors, one or more integrated circuits, and the like. Also, the term "memory" as used herein is intended to include memory associated with a processor or CPU, such as RAM, ROM, a fixed memory device (e.g., hard drive), or a removable memory device (e.g., diskette or CDROM). Also, memory is one example of a computer readable storage medium. In addition, the term "I/O devices" as used herein is intended to include one or more input devices (e.g., keyboard, mouse) for inputting data to the processing unit, as well as one or more output devices (e.g., CRT display) for providing results associated with the processing unit.

Accordingly, software instructions or code for performing the methodologies described herein may be stored in one or more of the associated memory devices, e.g., ROM, fixed or removable memory, and, when ready to be utilized, loaded into RAM and executed by the CPU.

Although illustrative embodiments have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for intercepting encrypted communications exchanged between a first computing device and a second computing device in a communication network, wherein the interception is performed by a third computing device in the communication network, the method comprising:

the third computing device obtaining one or more packets which are encrypted as part of an end-to-end encryption session associated with the first computing device and the second computing device, the one or more packets having a given packet address associated with one of the first computing device and the second computing device, wherein the one or more packets are obtained by the third computing device in response to at least one interception routing policy being implemented in at least one element in the communication network which is also responsible for routing non-intercepted packet traffic therethrough, wherein the at least one interception routing policy is configured to forward packets having the given packet address to the third computing device, the third computing device decrypting the one or more obtained packets using a security association established for a packet-source comprising the first computing device so as to obtain data contained therein;

the third computing device preserving the given packet address of the one or more obtained packets such that the one or more obtained packets do not appear to have been obtained by the third computing device; and the third computing device re-encrypting the one or more obtained packets using a security association established for a packet-destination comprising the second computing device, and forwarding the one or more packets toward the packet-destination;

wherein the one or more packets forwarded toward the packet-destination have the given packet address; and wherein the interception routing policy re-routes bearer flows from the packet-source and the packet-destination to the third computing device.

2. The method of claim 1, wherein the element of the communication network in which the interception routing policy is implemented comprises a device connected in a local area network in which the third computing device is connected.

3. The method of claim 2, wherein the element comprises a switching element.

4. The method of claim 3, wherein the interception routing policy is implemented in the switching element by modifying a forwarding table in the switching element to cause the one or more packets having the given packet address associated with one of the first computing device and the second computing device to be forwarded to the third computing device.

5. The method of claim 4, further comprising the third computing device decrypting the one or more packets.

6. The method of claim 4, further comprising the third computing device copying the one or more packets before forwarding the one or more packets toward the packet-destination.

7. The method of claim 6, further comprising the third computing device forwarding the one or more copied packets to another entity for decryption.

8. The method of claim 1, wherein the element of the communication network in which the interception routing policy is implemented comprises a device that is remote from the third computing device.

9. The method of claim 8, wherein the element comprises a routing element through which one of the first computing device and the second computing device accesses the communication network.

10. The method of claim 9, further comprising the third computing device, with knowledge of a security association for the packet-source, decrypting the one or more routed packets to obtain the data contained therein.

11. The method of claim 10, further comprising the third computing device, with knowledge of a security association for the packet-destination, re-encrypting the one or more routed packets before forwarding the one or more packets.

12. The method of claim 9, further comprising the third computing device establishing a virtual private network (VPN) tunnel with the routing element.

13. The method of claim 12, wherein the interception routing policy is implemented in the routing element by instructing the routing element to encapsulate the one or more packets having the given packet address associated with one of the first computing device and the second computing device, and to route the one or more encapsulated packets through the established VPN tunnel to the third computing device.

14. The method of claim 13, further comprising the third computing device establishing a second virtual private network (VPN) tunnel with a second routing element, the second routing element being a routing element through which the other of the first computing device and the second computing device accesses the communication network.

15. The method of claim 14, wherein the one or more packets are re-encrypted by the third computing device after the data contained therein is obtained, encapsulated, and routed through the second established VPN tunnel to the second computing device.

16. The method of claim 1, wherein the third computing device comprises a lawful interception server (LIS).

17. The method of claim 16, wherein the LIS comprises a signaling element and at least one bearer element.

18. The method of claim 16, wherein the element of the communication network in which the interception routing policy is implemented is the LIS.

19. The method of claim 1, wherein the given packet address comprises a source address and a destination address, the source address being associated with the packet-source and the destination address being associated with the packet-destination.

20. The method of claim 1, wherein the one or more packets forwarded toward the packet-destination comprise original header information of the one or more obtained packets.

21. An apparatus for intercepting encrypted communications exchanged between a first computing device and a second computing device in a communication network, the apparatus comprising:
a memory; and
a processor coupled to the memory and operative to:
obtain one or more packets which are encrypted as part of an end-to-end encryption session associated with the first computing device and the second computing device, the one or more packets having a given packet address associated with one of the first computing device and the second computing device, wherein the one or more packets are obtained in response to at least one interception routing policy being implemented in at least one element in the communication network which is also responsible for routing non-intercepted packet traffic therethrough, wherein the at least one interception routing policy is configured to forward packets having the given packet address to the third computing device;
decrypt the one or more obtained packets using a security association established for a packet-source comprising the first computing device so as to obtain data contained therein;
preserve the given packet address of the one or more obtained packets such that the one or more obtained packets do not appear to have been obtained by the third computing device;
re-encrypt the one or more obtained packets using a security association established for a packet-destination comprising the second computing device; and
forward the one or more packets toward the packet-destination;
wherein the one or more packets forwarded toward the packet-destination have the given packet address; and
wherein the interception routing policy re-routes bearer flows from the packet-source and the packet-destination to the third computing device.

22. The apparatus of claim 21, wherein the element of the communication network in which the interception routing policy is implemented comprises a device connected in a local area network in which the processor is connected.

23. The apparatus of claim 22, wherein the element comprises a switching element and wherein the interception routing policy is implemented in the switching element by modifying a forwarding table in the switching element to cause the one or more packets having the given packet address associated with one of the first computing device and the second computing device to be forwarded to the processor.

24. The apparatus of claim 21, wherein the element of the communication network in which the interception routing policy is implemented comprises a device that is remote from the processor.

25. The apparatus of claim 24, wherein the element comprises a routing element through which one of the first computing device and the second computing device accesses the communication network and the processor establishes a virtual private network (VPN) tunnel with the routing element.

26. The apparatus of claim 21, wherein the memory and the processor are part of a lawful interception server (LIS).

* * * * *